United States Patent [19]

Schirmer

[11] Patent Number: 4,935,271
[45] Date of Patent: Jun. 19, 1990

[54] LETTUCE PACKAGING FILM

[75] Inventor: Henry G. Schirmer, Spartanburg, S.C.

[73] Assignee: W. R. Grace & Co.-Conn., Duncan, S.C.

[21] Appl. No.: 240,994

[22] Filed: Sep. 6, 1988

[51] Int. Cl.[5] .............................................. B52B 3/02
[52] U.S. Cl. .................................... 428/35.2; 428/137; 428/349; 428/384; 428/355; 428/409; 428/515; 428/516; 428/520
[58] Field of Search ............... 156/233.5; 426/127; 428/35.2, 137, 349, 354, 355, 515, 516, 520, 409

[56] References Cited

U.S. PATENT DOCUMENTS

| | | | |
|---|---|---|---|
| 3,558,330 | 1/1971 | Widiger et al. | 426/127 |
| 4,178,401 | 12/1979 | Weinberg et al. | 426/127 |
| 4,439,478 | 3/1984 | Ferguson et al. | 428/137 |
| 4,657,610 | 4/1987 | Kematsu et al. | 428/137 |

FOREIGN PATENT DOCUMENTS

178218 A   1/1985   European Pat. Off. .
51-19081   2/1976   Japan .

Primary Examiner—Patrick Ryan
Attorney, Agent, or Firm—John J. Toney; William D. Lee, Jr.; Mark B. Quatt

[57] ABSTRACT

A multilayer laminate comprises a first perforated film of propylene homopolymer or copolymer, and a second film bonded to the first film and including a bonding layer of ethylene vinyl acetate copolymer and an outer heat sealable layer.

13 Claims, 1 Drawing Sheet

LETTUCE PACKAGING FILM

Lettuce is currently packaged in a non-stretchable heat resistant film. The film structure includes a layer of polyester bonded to a layer of polyethylene. This film offers low moisture permeability which is desirable in packaging lettuce and similar produce. However, it is also low in gas permeability, which reduces the shelf life of chopped lettuce when oriented heat set polyester is used.

Other heat set films typically used in this application have oxygen transmission rates of less than 5000 cc/meter$^2$ at 1 atmosphere 24 hours at 73° F.

With the packaging of lettuce and similar produce, it is desirable to provide a packaging material with a high gas permeability, preferably greater than 5000 cc per square meter, yet with low moisture transmission rates in order to resist loss of moisture from the food product.

SUMMARY OF THE INVENTION

In one aspect of the invention, a multilayer laminate comprises a first perforated film comprising propylene homopolymer or copolymer, and a second film, bonded to the first film, including a bonding layer of ethylene vinyl acetate copolymer, and an outer heat sealable layer.

In another aspect of the present invention, a method of making a multilayer laminate comprises providing a perforated film comprising a propylene homopolymer or copolymer, coextruding a second film having a bonding layer of ethylene vinyl acetate copolymer and an outer heat sealable layer, and bonding the second film to the perforated film. In yet another aspect of the present invention, a method of making a multilayer laminate comprises providing a perforated film comprising a propylene homopolymer or copolymer, coextruding a second film having a bonding layer of ethylene vinyl acetate copolymer and an outer heat sealable layer, corona treating the coextruded film at its bonding surface and then bonding the corona treated surface of the second film to the perforated film.

In yet another aspect of the present invention, a multilayer laminate comprises a first perforated film comprising propylene homopolymer or copolymer; and a second film bonded to the first film including a bonding layer of ethylene vinyl acetate copolymer and an outer heat sealable layer wherein the outer heat sealable layer of the second film comprises a blend of ethylene vinyl acetate copolymer and an antiblocking agent masterbatch.

BRIEF DESCRIPTION OF THE DRAWINGS

The invention can be further understood by reference to the drawing figures, wherein.

DESCRIPTION OF THE PREFERRED EMBODIMENTS

Figure 1:
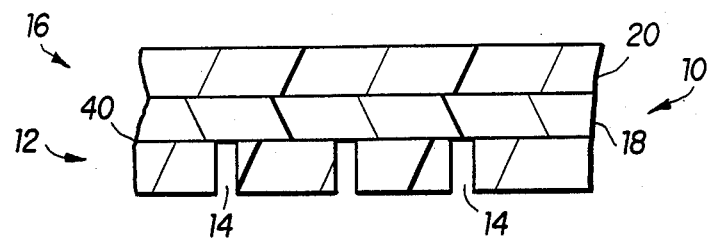
FIG. 1 is a schematic cross sectional view of the multilayer laminate of the present invention.

Referring to FIG. 1, the multilayer laminate 10 includes a perforated film 12 having perforations 14 therein. In the preferred embodiments, layer 12 comprises a propylene homopolymer (PP), although a propylene copolymer such as ethylene propylene copolymer (EPC) may be used. Various homopolymers and copolymers of polypropylene are commercially available and well known in the art. One film especially preferred for the present invention is a commercial film designated PY supplied by the Cryovac Division of W. R. Grace & Co.-Conn.

A coextruded film 16 is also depicted in FIG. 1. Film 16 includes a bonding layer 18 and an outer heat sealable layer 20. In the preferred embodiment, bonding layer 18 is made up of a high vinyl acetate, low melting point ethylene vinyl acetate copolymer (EVA) such as Alathon 3180 available from du Pont, having a melt index of between 23 and 27 grams/10 minutes, a vinyl acetate content by weight of between 27 and 29%, and a density of between about 0.948 and 0.954 grams per cubic centimeter. Outer heat sealable layer 20 can be the same material as in layer 18, or another ethylene vinyl acetate copolymer such as Exxon 32.89, an EVA with a vinyl acetate content of about 4.5%. Layer 20 can also be a very low density polyethylene (VLDPE).

Lower vinyl acetate content EVA resins, such as the Exxon 32.89 material just described, may also be used as the material of the bonding layer 18 of second film 16. However, when used in connection with a corona treatment process for bonding the second film 16 to first film 12, lower vinyl acetate EVA resins will not perform as well as higher vinyl acetate resins such as the du Pont material described above. High vinyl acetate content combined with relatively low melting points characterize the optimal EVA resins for bonding layer 18.

Figure 2:
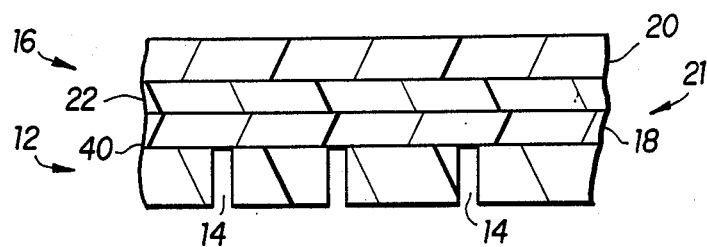
FIG. 2 is a schematic cross sectional view of an alternate embodiment of a multilayer laminate in accordance with the present invention.

Referring to FIG. 2, a multilayer laminate 21 like that of FIG. 1 is shown, but in which a core layer 22 is disposed between the bonding layer 18 and outer heat sealable layer 20 of second film 16. The preferred resin for bonding core layer 22 is a linear low density polyethylene (LLDPE) such as Dowlex 2045 available from Dow and having a density of about 0.921 grams/cc.

Figure 3:
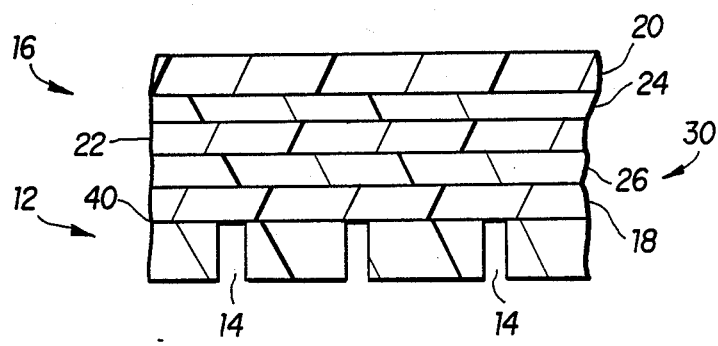
FIG. 3 is a schematic cross section of still another embodiment of the multilayer laminate of the present invention.

In still another embodiment of the present invention, depicted in FIG. 3, intermediate layers 26 and 24, preferably having an ethylene vinyl acetate copolymer, are disposed between core layer 22 and bonding layer 18 and outer heat layer sealable layer 20 respectively. These intermediate layers 24 and 26 can perform a variety of functions such as enhancing interlaminar bond strength, contributing to the strength of the overall coextruded film 16 and laminate 30, and providing other processing advantages.

A particularly suitable resin for intermediate layers 24 and 26 is Elvax PE-3508 available from du Pont. This material has a vinyl acetate content of about 12% by weight and a melt index of about 0.3 grams/10 minutes.

The perforated film 12 may be made by extruding a polypropylene or ethylene propylene copolymer film, and perforating same by means well known in the art such as flame or needle perforation.

The second multilayer film 16 can be made by standard coextrusion techniques.

Multilayer second film 16 is bonded to perforated film 12 preferably by corona treating the bonding layer surface of bonding layer 18, and then, preferably under some heat and pressure, adhering the second film 16 to the perforated film 12. This bond is designated at 40 in the drawings.

Other bonding techniques, including the use of conventional lamination adhesives, may also be used. However, bonding techniques in which a separate adhesive is utilized may be less desirable where certain end uses, such as lettuce packaging, are combined with certain types of machinery for creating a finished package.

In the preferred embodiment, packaging film of the present invention is especially suitable for use in connection with Kartridg-Pak or other types of vertical form fill seal machinery.

The invention may be further understood by reference to Table 1 indicating specific laminate structures made in accordance with the present invention.

TABLE 1

| EXAMPLE | |
|---|---|
| 1 | PP//EVA/VLDPE |
| 2 | PP//EVA/LLDPE/EVA |
| 3 | PP//EVA/EVA/LLDPE/EVA/EVA |

In the film of Example 3, about 20% of the EVA of bonding layer 18 and outer heat sealable layer 20 comprised an antiblocking agent which had been pre-blended with the EVA prior to extrusion. The antiblocking agent used included 90% low density polyethylene blended with 10% of a colloidal silica master batch.

Although the present invention has been described by reference to the specific embodiments and examples, those skilled in the art would readily understand that modifications may be made by one skilled in the art after a review of this description without departing from the spirit and scope of the claims which follow.

I claim:

1. A multilayer laminate comprising:
   (a) a first perforated film comprising propylene homopolymer or copolymer; and
   (b) a second film, bonded to the first film, including a bonding layer of ethylene vinyl acetate copolymer, and an outer heat sealable layer, wherein the bonding layer of ethylene vinyl acetate copolymer is located between the first perforated film and the outer heat sealable layer.

2. A multilayer laminate according to claim 1 wherein the first perforated film comprises a propylene homopolymer.

3. A multilayer laminate according to claim 1 wherein the bonding layer of the second film comprises a high vinyl acetate, low melting point ethylene vinyl acetate copolymer.

4. A multilayer laminate according to claim 3 wherein the ethylene vinyl acetate copolymer has a vinyl acetate content, by weight of the resin, of between about 4.5% and 28%.

5. A multilayer laminate according to claim 1 wherein the outer heat sealable layer of the second film is an ethylene vinyl acetate copolymer.

6. A multilayer laminate according to claim 5 wherein the outer heat sealable layer of the second film is the same material as that of the bonding layer.

7. A multilayer laminate according to claim 5 further comprising a core layer of linear low density polyethylene disposed between the bonding layer and the outer heat sealable layer.

8. A multilayer laminate according to claim 7 wherein an intermediate layer of ethylene vinyl acetate copolymer is disposed between and bonds the core layer to each of the bonding and heat sealable layers respectively.

9. A multilayer laminate according to claim 1 wherein the outer heat sealable layer of the second film is a very low density polyethylene.

10. A multilayer laminate according to claim 1 wherein the outer heat sealable layer of the second film comprises a blend of ethylene vinyl acetate copolymer and an antiblocking agent master batch.

11. A multilayer laminate according to claim 10 wherein the outer heat sealable layer of the second film comprises a blend of about 80% ethylene vinyl acetate copolymer and about 20% of an antiblocking agent master batch.

12. A method of making a multilayer laminate comprising:
   (a) providing a perforated film comprising a propylene homopolymer or copolymer;
   (b) coextruding a second film having a bonding layer of ethylene vinyl acetate copolymer and an outer heat sealable layer; and
   (c) bonding the bonding layer of the second film to the perforated film.

13. A method according to claim 12 wherein the coextruded film is corona treated at its bonding surface and then bonded at its corona treated surface to the perforated film.

* * * * *